United States Patent
Chan

(12)
(10) Patent No.: US 6,758,585 B1
(45) Date of Patent: Jul. 6, 2004

(54) ARTICULATED, ADJUSTABLE STAND

(76) Inventor: Erik S. Chan, 10 Lavine Ct., Orinda, CA (US) 94563

( * ) Notice: Subject to any disclaimer, the term of this patent is extended or adjusted under 35 U.S.C. 154(b) by 66 days.

(21) Appl. No.: 10/157,703

(22) Filed: May 29, 2002

(51) Int. Cl.[7] .................................................. F21S 8/08
(52) U.S. Cl. ...................... 362/414; 362/250; 362/370; 362/402; 362/427; D26/63; D26/93; 248/688; 248/562; 248/566; 248/164
(58) Field of Search ............................ 362/3, 8, 11, 33, 362/86, 89, 91, 217, 220, 225, 227, 249, 250, 257, 285, 287, 288, 362, 368, 370, 371, 372, 382, 399, 401, 402, 410, 413, 414, 418, 427, 428, 419; D26/24, 60, 61, 63, 93, 113, 138; 248/682, 688, 560, 562, 566, 580, 584, 585, 586, 592, 599, 121, 122, 122.1, 125.1, 125.2, 158, 163.1, 164, 166, 168, 170, 582, 595, 600, 614, 127, 129, 146, 144, 371, 372.1, 161, 162.1, 431, 173.3

(56) References Cited

U.S. PATENT DOCUMENTS 1,121,744 A * 12/1914 McLaughlin ................. 108/93
2,492,676 A * 12/1949 Zajicek ........................ 280/641
2,829,863 A * 4/1958 Gibson ........................ 254/8 C
3,543,019 A * 11/1970 Gibson ........................ 362/413
4,611,823 A * 9/1986 Haas ........................... 248/439
4,967,672 A * 11/1990 Leather ....................... 108/120
5,087,013 A * 2/1992 Gress et al. ................. 248/439
5,170,975 A * 12/1992 Chadwick ................ 248/284.1
5,560,582 A * 10/1996 Beelen ........................ 248/439
6,139,164 A * 10/2000 Bolta et al. ................. 362/418
6,354,720 B2 * 3/2002 Grossman et al. .......... 362/414

* cited by examiner

Primary Examiner—Alan Cariaso
Assistant Examiner—Ismael Negron
(74) Attorney, Agent, or Firm—Mark J. Spolyar

(57) ABSTRACT

An articulated stand having an adjustment mechanism featuring a hinge-and-wheel assembly. In one embodiment, the present invention provides an articulated, adjustable stand comprising an upwardly extending arm, a downwardly extending leg pivotally attached to the upwardly extending arm, a wheel rotatably mounted to a first end of the downwardly extending leg, and a spring element connecting the first arm member and the second leg member.

22 Claims, 4 Drawing Sheets

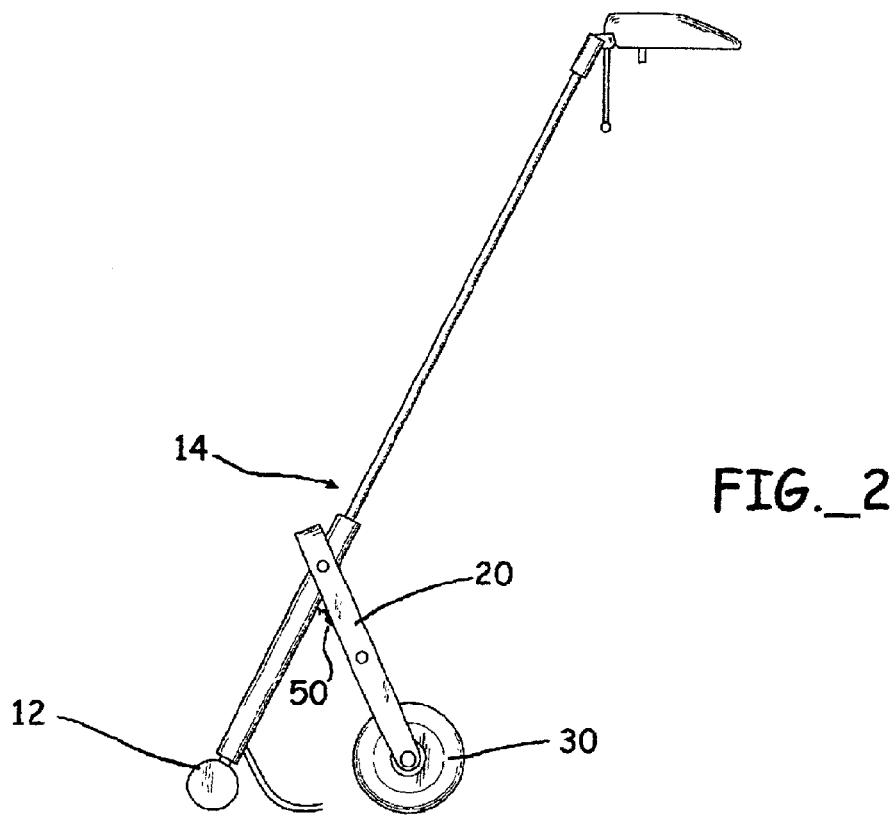
FIG._2
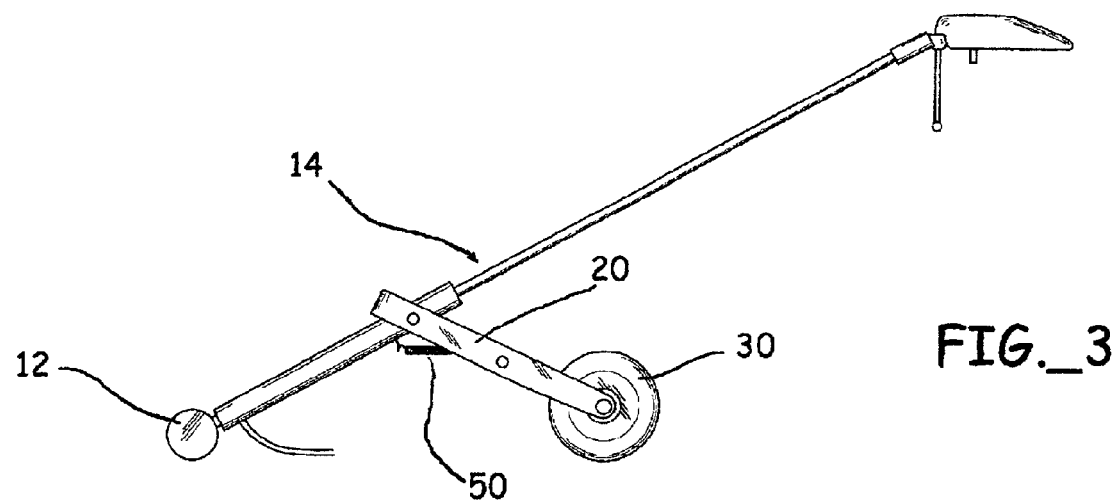
FIG._3

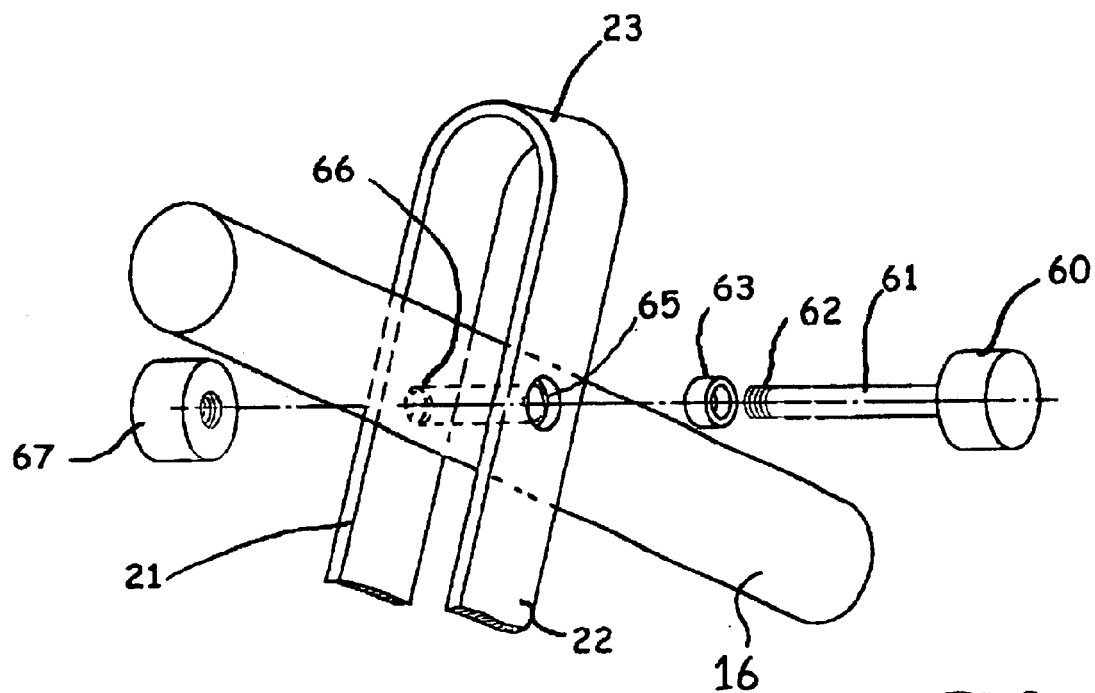
FIG._4
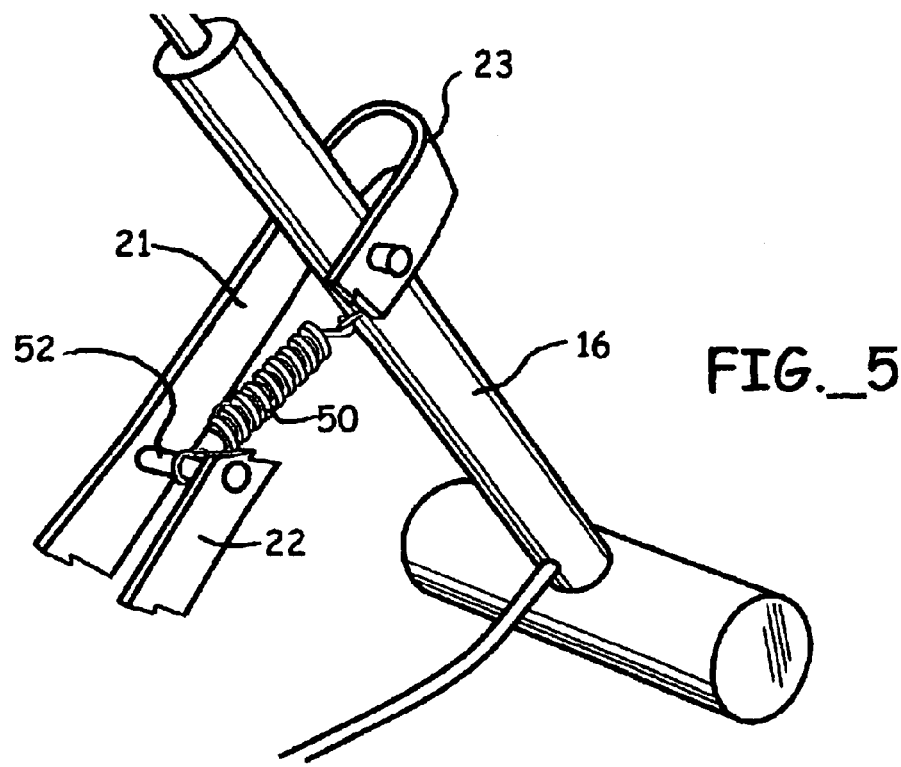
FIG._5

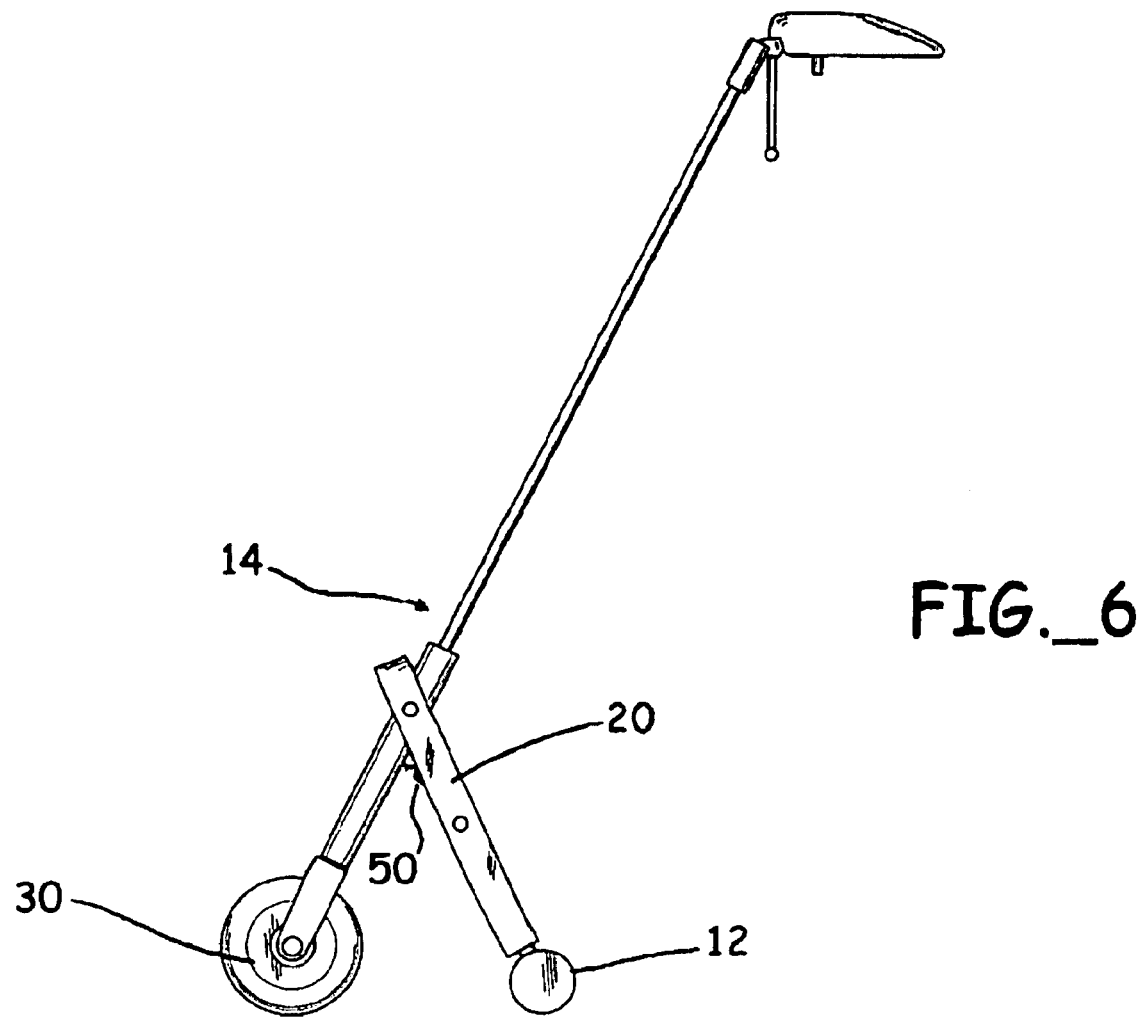
FIG._6

US 6,758,585 B1

ARTICULATED, ADJUSTABLE STAND

RELATED APPLICATION

The present application claims priority from U.S. Design patent application Ser. No. 29/155,987, filed Feb. 21, 2002 and entitled "Desk Lamp."

FIELD OF THE INVENTION

The present invention relates to an adjustable, articulated stand and, in one embodiment, to an adjustable, articulated stand for use in connection with a light source to form a desk lamp.

BACKGROUND OF THE INVENTION

Adjustable stands, such as those used in connection with desk lamps, of a variety of configurations are known in the art. Indeed, the prior art is replete with a wide variety of hinge and joint configurations to allow users to adjust the stands to a desired height and/or position. For certain uses of adjustable stands, such as desk lamps, a unique overall and/or mechanical design is desirable.

While the adjustable stands of the prior art fulfill their respective objectives, the prior art does not teach or suggest an articulated, adjustable stand including a novel hinge-and-wheel assembly as more fully described below.

SUMMARY OF THE INVENTION

The present invention provides an articulated stand having a novel adjustment mechanism featuring a hinge-and-wheel assembly. In one embodiment, the present invention provides an articulated, adjustable stand comprising an upwardly extending arm, a downwardly extending leg pivotally attached to the upwardly extending arm, a wheel rotatably mounted to a first end of the downwardly extending leg, and a tensile element connecting the first arm member and the second leg member. The adjustable stand, according to one embodiment, is movable between a most upright position and a lowest position. In one embodiment, the tensile element biases the leg toward the arm as the stand is adjusted from a lower position toward the most upright position. As the Figures illustrate, the adjustable stand can be used in connection with a light source to create a novel desk lamp.

DESCRIPTION OF THE DRAWINGS

FIG. 2 is a side plan view illustrating the articulated stand oriented in a first position.

FIG. 3 is a side plan view illustrating the articulated stand oriented in a second position.

FIG. 4 is an exploded perspective view of the pivotal joint or attachment between the upwardly projecting arm and the downwardly projecting leg of the stand according to one embodiment of the present invention.

FIG. 5 is a sectional view illustrating a spring connecting the upwardly projecting arm and the downwardly projecting leg of the stand according to one embodiment of the present invention.

FIG. 6 is a side plan view setting forth an articulated stand according to another embodiment of the present invention.

DESCRIPTION OF PREFERRED EMBODIMENTS

Figure 1:
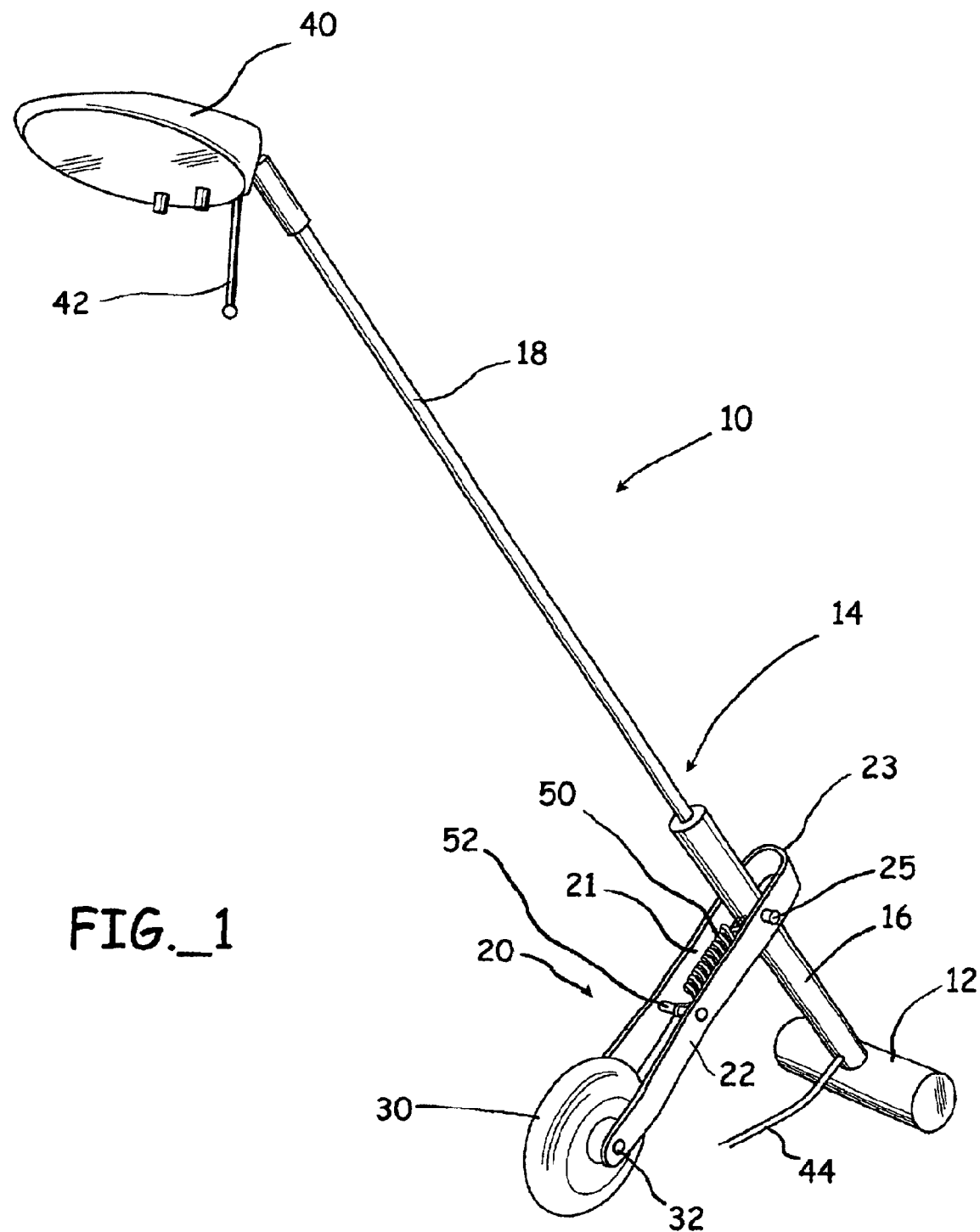
FIG. 1 is a perspective view of a desk lamp including the articulated stand according to an embodiment of the present invention.

As the various Figures illustrate, the present invention provides an adjustable, articulated stand suitable for use in connection with a light source to form a desk lamp 10 and the like. The articulated, adjustable stand of the present invention can also be used to support a fan, medical instrument, etc.

As FIG. 1 shows, desk lamp 10, in one embodiment, comprises cylindrical base 12, upwardly projecting arm 14, downwardly projecting leg 20, wheel 30, and light source 40. Upwardly projecting arm 14, in one embodiment, comprises first arm section 16 and second arm section 18. In one embodiment, second arm section 18 is smaller in diameter to first arm section 16 and extends from a hole in first arm section 16. In one embodiment, a set screw (not shown) holds second arm section 18 in place relative to first arm section 16. Of course, any suitable method for attaching first and second arm sections 16 and 18 can be used. As FIG. 1 provides, upwardly projecting arm 14, in one embodiment, extends from cylindrical base 12. The cross-sectional shape of base 12, however, need not be cylindrical; rather, base 12 can have any suitable cross sectional shape, such as triangle, square, polygon, etc.

As FIG. 1 illustrates, downwardly projecting leg 20 is a U-shaped member including first and second leg sections 21 and 22 extending from opposite ends of bend region 23. Projecting leg 20 is pivotally attached to arm 14 (in one embodiment, to first arm section 16) at joint 25. As FIG. 1 illustrates, in one embodiment, first and second leg sections 21 and 22 pivotally attach to opposite sides of first arm section 16 at joint 25. In addition, wheel 30 rotatably attaches to first and second leg sections 21 and 22 at axis 32. Wheel 30 can be any suitable wheel; in one embodiment, wheel 30 is a rubberized wheel similar to a wheel used in connection with in-line roller skates or rollerblades. As with such wheels, wheel 30 may optionally include components to facilitate smooth rotation such as ball bearings and the like.

As FIGS. 1 and 5 illustrate, lamp 10 further comprises spring 50 attached at one end to downwardly projecting leg 20 at cross bar 52, and at the other end to first arm section 16. In one embodiment, spring 50 attaches to first arm section with a book at one end of spring 50 that extends through a hole or two holes in first arm section 16. In one embodiment, the other end of spring 50 includes a loop that extends around cross bar 52. Of course, any suitable method for attaching spring 50 can be used. Spring 50 can be a standard steel coil spring, as well as any other suitable component that possesses sufficient tensile qualities, such as a section of elastic material, such as a section of rubber or other elastomeric material, and the like.

FIG. 4 illustrates an assembly associated with joint 25 between upwardly projecting arm 14 and downwardly projecting leg 20. As FIG. 4 provides, the assembly comprises bolt 61 including head 60 and threaded region 62, spacer ring 63, and nut 67. In one embodiment, the surfaces of head 60 and nut 67 are knurled to allow a user to tighten the assembly by hand. As FIG. 4 illustrates, bolt 61 extends through spacer ring 63 and holes 65 and 66. Spacer ring 63 engages and extends with hole 65 to contact the outer surface of first arm section 16. Nut 67 engages threaded region 62 of bolt 61. As the assembly is tightened, head 60 presses spacer ring 63 against the outer surface of first arm section 16 to thereby, among other things, increase the friction between the outer surface of first arm section 16 and leg section 21. Accordingly, adjustment of the joint assembly increases/decreases the friction associated with the joint and, therefore, the ease with which leg 20 moves relative to arm 14. Of course, any suitable assembly for imparting the requisite friction at joint 25 can be used.

FIGS. 2 and 3 illustrate the range of adjustability associated with one embodiment of the present invention. When lamp 10 is oriented in its most upright position (FIG. 2), spring 50, in one embodiment, is in an un-tensioned or slightly-tensioned state. The combination of frictional force provided by the assembly discussed above and the tensional force provided by spring 50 holds lamp 10 in position. However, as light source 40 is lowered, the moment provided by the weight of light source increases. However, as light source 40 is lowered, the tension of spring 50 increases to compensate for the increased moment. Again, the friction provided at joint 25, in combination with spring 50, further operates to hold the assembly in any desired position between the most upright position (FIG. 2) and the lowest position (FIG. 3). In addition, spring 50 also biases downwardly projecting leg 20 towards upwardly projecting arm 14 (back to its most upright position) when the user adjusts lamp 10 from a lower position to a higher position. In addition, as lamp 10 is raised and lowered, wheel 30 rotates; further, lamp 10 pivots about the point where cylindrical base 12 contacts the surface upon which lamp 10 is placed Although the embodiment described above utilizes both the friction at joint 25 and spring 50. Other embodiments can use either the friction at joint 25 or spring 50 as the sole means of holding lamp 10 in a desired orientation. However, it will be appreciated that the embodiment including a spring (with or without induced friction at joint 25) is preferred as spring 50 retracts downwardly projecting leg 20 as lamp 10 is raised. Accordingly, without spring 50, the user must manually retract downwardly projecting leg as lamp 10 is raised from a lower position.

As FIG. 1 also shows, lamp 10 further includes light source 40 attached to the outer end of projecting arm 14. In one embodiment, light source 40 is pivotally attached to second arm section 18 via a ball joint. Lamp 10, in one embodiment, further comprises stem 42 extending from light source 40 to facilitate adjustment of light source 40. Light source 40 can be any shape and configuration, such as a half dome, half cylinder, etc. In addition, light source 40 may comprise a standard bulb, a fluorescent bulb, a halogen bulb, or the like. As FIG. 1 provides, cord 44, in one embodiment, extends from light source 40 through first and second arm sections 16 and 18 and out a hole in first arm section 16 (see FIG. 1). Cord 44 further includes a conventional electrical plug (not shown) at the end opposite light source 44. In another embodiment, however, light source 44 may be battery powered, potentially obviating the need for cord 44 and an electrical plug.

In addition, FIG. 6 provides an alternative embodiment of the present invention. As FIG. 6 shows, the positions of wheel 30 and base 12 are switched. Specifically, base 12 is attached to downwardly projecting leg 20, while wheel 30 is rotatably mounted to the bottom end of upwardly projecting arm 14. Otherwise, this embodiment is substantially the same as that described above.

Lastly, although the present invention has been described with reference to specific embodiments, various other embodiments are possible without departing from the scope of the present invention. Other embodiments of the present invention will be apparent to one of ordinary skill in the art. It is, therefore, intended that the claims set forth below not be limited to the embodiments described above.

What is claimed is:

1. An adjustable stand, comprising
   a cylindrical base having an axis,
   an upwardly extending arm attached to the cylindrical base and extending perpendicularly to the axis of the cylindrical base,
   a downwardly extending leg pivotally attached to the upwardly extending arm, and
   a wheel rotatably mounted to a first end of the downwardly extending leg.

2. The adjustable stand of claim 1 further comprising means for increasing the static frictional force between the upwardly extending arm and the downwardly extending leg at the pivotal attachment therebetween.

3. The adjustable stand of claim 1 wherein the downwardly extending leg comprises a U-shaped member including first and second leg sections extending from a bend section, wherein the upwardly extending arm is pivotally attached to the downwardly extending leg proximal to the bend region and between the first and second leg sections, and wherein the wheel is rotatably mounted to the downwardly extending leg between the first and second leg sections.

4. The adjustable stand of claim 3 further comprising means for increasing the static frictional force between the upwardly extending arm and the first and second leg sections of the downwardly extending leg at the pivotal attachment therebetween.

5. The adjustable stand of claim 1 further comprising a light source attached to the upper end of the upwardly extending arm.

6. The adjustable stand of claim 5 wherein the light source is pivotally attached to the upwardly extending arm.

7. The adjustable stand of claim 1 further comprising
   a tensile element connecting the upwardly extending arm and the downwardly extending leg member.

8. The adjustable stand of claim 7 wherein the tensile element is a spring.

9. The adjustable stand of claim 7 wherein the tensile element is a coil spring.

10. The adjustable stand according to claim 7 wherein the upwardly extending arm is movable between a first most upright position and a second lowest position.

11. The adjustable stand of claim 10 wherein the tensile element biases the downwardly extending leg toward the upwardly extending arm as the adjustable stand is adjusted toward the first most upright position.

12. An adjustable lamp stand, comprising
   a base,
   an arm extending upwardly from the base,
   a light source attached to the arm opposite to the base,
   a leg pivotally attached to and extending downwardly from the arm; wherein the leg comprises a U-shaped member including two leg sections extending from a bend section;
   a wheel rotatably mounted to the leg opposite to the pivotal attachment; and
   a tensile element connecting the arm and the leg;
   wherein the rod is pivotally attached to the leg proximal to the bend section and between the two leg sections, and wherein the wheel is rotatably mounted to the leg between the leg sections.

13. The adjustable lamp stand of claim 12 wherein the base comprises a cylinder.

14. The adjustable lamp stand of claim 12 wherein the light source is pivotally attached to the arm.

15. The adjustable lamp stand of claim 12 further comprising means for increasing the static frictional force between the arm and the leg at the pivotal attachment therebetween.

16. The adjustable lamp stand of claim 12 wherein the tensile element is a coil spring.

17. The adjustable lamp stand according to claim 12 wherein the arm is movable between a first most upright position and a second lowest position.

18. The adjustable lamp stand of claim 12 wherein the tensile element biases the leg toward the arm as the lamp stand is adjusted toward the first most upright position.

19. An adjustable stand, comprising a base having a central axis, an upwardly extending arm attached to the base and extending perpendicularly to the central axis of the base, a downwardly extending leg pivotally attached to the upwardly extending arm, a wheel rotatably mounted to a first end of the downwardly extending leg, and a tensile element connecting the first arm member and the second leg member.

20. The adjustable stand of claim 19 wherein the base has a circular cross sectional shape.

21. The adjustable stand of claim 19 wherein the tensile element biases the downwardly extending leg toward the upwardly extending arm as the adjustable stand is adjusted toward the first most upright position.

22. An adjustable stand, comprising a cylindrical base having an axis, an upwardly extending arm, a downwardly extending leg pivotally attached to the upwardly extending arm, wherein the downwardly extending leg is attached to the cylindrical base perpendicularly to the axis of the cylindrical base, a wheel rotatably mounted to a first end of the downwardly extending leg.

* * * * *